United States Patent [19]

Rhoades et al.

[11] Patent Number: 4,766,389
[45] Date of Patent: Aug. 23, 1988

[54] CAPACITOR ARRAY SENSORS TACTILE AND PROXIMITY SENSING AND METHODS OF USE THEREOF

[75] Inventors: Lawrence J. Rhoades, Pittsburgh; Donald Risko, Monroeville; Ralph L. Resnick, Slickville, all of Pa.

[73] Assignee: Extrude Hone Corporation, Irwin, Pa.

[21] Appl. No.: 903,178

[22] Filed: Sep. 3, 1986

[51] Int. Cl.[4] .......................... G01B 7/28; G01B 7/34
[52] U.S. Cl. .......................... 324/61 QS; 324/61 QL; 73/862.04; 73/862.68; 414/5; 901/33; 901/46; 361/283
[58] Field of Search ........... 324/61 QS, 61 QL, 61 R, 324/61 P; 340/870.37; 901/33, 46, 9, 10, 34, 35; 73/862.04, 862.05, 862.68; 361/278, 280, 283, 287, 290; 414/5, 6

[56] References Cited

U.S. PATENT DOCUMENTS

| | | | |
|---|---|---|---|
| 3,651,505 | 3/1972 | Schmidt | 340/870.37 X |
| 4,266,263 | 5/1981 | Haberl et al. | 361/283 |
| 4,413,349 | 11/1983 | Bailey | 324/61 QS |
| 4,451,780 | 5/1984 | Ogasawara | 324/61 R |
| 4,526,043 | 7/1985 | Boie et al. | 901/46 X |
| 4,555,953 | 12/1985 | Dario et al. | 901/33 |
| 4,557,386 | 12/1985 | Buckley et al. | 901/46 X |
| 4,584,625 | 4/1986 | Kelloggg | 361/283 |
| 4,588,348 | 5/1986 | Beni et al. | 414/730 |
| 4,611,296 | 9/1986 | Niedermayr | 901/46 X |

FOREIGN PATENT DOCUMENTS 226827A 9/1985 German Democratic Rep. ... 901/46

*Primary Examiner*—G. P. Tolin
*Assistant Examiner*—H. L. Williams
*Attorney, Agent, or Firm*—James S. Waldron

[57] ABSTRACT

An arrangement for a tactile sensing system involved in the determination of object shape, contour, orientation and detection of slip finding one use in real time control of robotically manipulated tools. The sensor uses contact between the object and a gripper upon which the sensor is disposed wherein the object surface forms one plate of the sensing electrode.

24 Claims, 2 Drawing Sheets

$$C = K \frac{A}{t}$$

CAPACITOR ARRAY SENSORS TACTILE AND PROXIMITY SENSING AND METHODS OF USE THEREOF

In the past there have been a number of uses of capacitance based sensors, typified by the use of metal plated onto mylar film employed as one plate of a capacitor for the evaluation and quantification of surface roughness and the like of machined metal surfaces and the like. See for example, U.S. Pat. Nos. 4,422,035 issued to Risko and 4,182,981 issued to Shum.

Such sensors have established a highly useful role in industrial manufacturing and in the machine tool industry, in particular, for the characterization of surface properties. As the art is now aware, these sensors are based on the employment of the variable capacitance, due to the coupling of the sensor with a surface to be evaluated, by techniques such as controlling the rate of an oscillator circuit, so that the frequency of the oscillator is directly determined and altered as a function of surface roughness.

The need for improved tactile sensing systems has dramatically increased as "intelligent" machines and robots are finding greater usage in sophisticated tasks, such as robotic assembly and the like. Tactile sensing needs include the detection of slip, or incipient slipping, for robotic grippers or "hands" and related tools, the identification of shape, surface features, texture, gripping force, and related factors. Existing applications attempt to substitute non-tactile techniques for these functions, and robotic implements generally lack effective tactile sensing at the gripper to provide adequate control information to govern motion and operation of the robotic tools. It has generally been considered necessary to rely on optical robot vision techniques, and other highly complex operations to make up for the lack of direct, high speed tactile feedback information.

Tactile sensing is generally defined as continuous variable sensing of contact conditions over an area, as distinguished from simpler "touch sensing" which is usually associated with force or torque measurements. Tactile sensing includes the abilities of "groping", and in so doing, of identifying shape, surface features, texture, force and slip. By one means or another, one or more of these features and capabilities are required in virtually all automated and robotic applications. These needs are not always adequately met by existing techniques. It has been estimated, for example, that at least fifty percent of all robotic applications need slip detection to provide feedback contol signals for the governance of gripping force, but the techniques presently available are too slow, too insensitive, and too complex and expensive to be adequate to meet the existing need. The need of the art is expected to grow, both in magnitude and in the level of performance, in the near future.

In an entirely different aspect of robot technology, the techniques for guiding motion of robotic implements and tools is dependent on non-contact, non-tactile sensing. These requirements impose a completely different set of problems for the art, and here too there are serious limitations.

In the simplist systems, the robots are "blind," and movement is through a predetermined pattern of movement and function based on memory. While such operations are suitable and even highly effective for many types of operation, the burdens on the support and logistics are critical, expensive, and limiting on the power and particularly the flexibility of the system. Parts must be fed to precise location, in precise orientation, and must be assuredly within tolerances. Even slight deviations will disrupt the effectiveness of the operation.

In order to overcome these limitations, and to provide greater flexibility and more lenient tolerances, remote sensor computer vision based controls have been developed extensively. Such optical, and related systems are generally effective, but only at the expense of considerable time and computational complexity which lead to relatively slow operations, high capital costs, and difficulties in the areas of greatest concern, the final approach guidance to contact between the robot gripper or implement and the part. Failures are common in such system because of the difficulties of real time resolution of ambiguities of shape recognition and in the lack of adequate resolution of the remote sensors at final approach. As the "hand" approaches a part to be "picked up," the need for high resolution is greatest, but the capabilities of such systems is deteriorating because of obscured vision at the critical point, and by virtue of the decrease in relative resolution as the parameters requiring control converge. The capabilities of such systems are inherently the reverse of what is required; as the approach becomes more demanding, the nature of the systems results in deteriorating sensitivity and resolution. Proximity sensing and real time control remains a pressing need in the art. In addition, if computer vision systems are relieved from the fine detail resolution requirements of final approach guidance and control, they can be made faster and more effective in gross motion control and guidance, collision avoidance, and related control functions to which they are more directly suited.

It is accordingly an object of the present invention to provide proximity and tactile sensors which will meet the needs of the art in the foregoing and other respects.

SUMMARY OF THE INVENTION

In the present invention, multiple capacitor arrays are provided which are employed for a diversity of applications, particularly in the field of robotics, which are great improvements in the techniques employed in the past.

The multiple element arrays are configured for both collective and separate sensing of capacitance properties, permitting a variety of non-contact and contact based measurements, from which a number of important determinations can be made. These include measures of approach and proximity, which can be employed as a real time machine control parameter for the direction of robotic tools for engaging and manipulating objects, for the determination of object location, orientation, and configuration, including such diverse matters as shape, edge location, part identification, measurement of size and shape of parts for the detection of defects, measure of surface properties, including surface roughness, conformity to quality control tolerances for shape, dimensions, surface finish, and the like, and for the detection of slip, and particularly incipient slip, of a part relative to a sensor when used as an element of a part holder in robotic implements such as robotic "hands" and the like, for real time grip feedback and control systems. The capacitance array based detectors and sensors of the present invention operate in a highly sensitive and high speed manner suitable for real time control of robotic equipment and elements via analog or digital electronic control techniques. Digital systems, based on closed loop feedback control techniques are preferred, particularly with discrete multiplexing of capacitance measurement from each capacitor plate in the array. Serial polling may also be employed, although the sampling rates required for some uses of the system will limit the desirability of such techniques.

In the present invention, the features and functions are attained by forming an array of a plurality of discrete capacitor plates on a surface. Each individual capacitor plate will conform generally to the structure of the sensors of the prior patents of Risko and of Shum i.e. U.S. Pat. Nos. 4,422,035 and 4,182,981, disclosed above. In providing a plurality of such elements, there are requirements for providing separate leads for each, and when the elements are formed, as is preferred, from metal plated Mylar film, the multiple elements and the associated leads therefor can be readily made by the same techniques described in the prior patents for the formation of individual elements. The layout is not critical, but it is preferred that it be a regular repeating pattern, formed with a high degree of precision, since the accuracy of the measurements to be taken will depend on the accuracy of the pattern. Otherwise it may be necessary to employ time consuming and difficult error compensation techniques in the evaluation of the output from the sensors. Layout of the array is preferably in a hexagonal pattern of hexagonal elements, but other arrangements are effective as well.

Resolution of the measurements to be taken with the system based on evaluation of the capacitance values for each element or cell in the array will be dependent on the size of the elements, while other evaluations will be based on comparative values taken from a plurality of elements, and the resolution will be dependent on the closeness of the elements as well as the discrete size of each. Other parameters, which treat the discrete elements collectively, as a single capacitor plate, are dependent on the size and, more particularly, the total area of the array as a whole.

In this context, then, it is self evident that the number of elements, their size, and the closeness of their packing should be consistent with the values to be determined and the resolution required, as will be developed in more detail hereinafter. As a general parameter, the number, size, packing density, and total area of the elements of the array should be as great as the capacity of the control system employed will accept at speeds consistent within real time feedback rate requirements. Some of the parameters of interest in the present system require sensing and data evaluation at relatively high speeds, compared to prior art usages of such sensors as single elements. For example, for slip sensing applications, the sampling rate should be at least about 300 Hertz, and preferably 1,200 Hertz, or even higher. Since the data from a multiplicity of elements in an array are required, the computational load on the control system may be quite demanding.

Each of the measurable or detectable parameters which is to be derived from the sensor array is dependent on a different set of criteria and must be considered individually. Thus, it is not possible to employ the sensor as a proximity detector and approach control input by the same techniques and algorithms employed for slip sensing. Nonetheless, it is important to recognize that the present invention is predicated on the ability of a single sensor array to adequately and effectively perform functions which have not been available to the art at all, as well as others which have not been handled by prior art approaches in real time contexts. It is an added benefit that the array sensors will also function in other contexts and for other purposes previously known for single element sensors with no diminution of effectiveness.

Proximity sensing is a function of the high level of sensitivity of capacitance as an inverse of the distance between capacitor plates. If the sensor of the present invention approaches an object which, by the techniques discussed hereinafter, acts as an opposed capacitor plate in relation to the array as a whole, changes in capacitance becomes detectable at substantial distances, measurable in pluralities of inches in many cases, and becomes progressively more sensitive to changes in distance as the absolute distance grows smaller. Thus, by evaluating the capacitive coupling between an object and the sensor array, with the array carried on a robotic "hand" or gripping tool for example, as the reactive distance decreases, the capacitance change is a function of the distance between the two, and the values obtained can be employed in a closed loop feed back contol system to direct the approach to the object and engagement therewith with very high precision and accuracy. For a given element, the results are very highly reproducable, so that a very safe and effective control of such operations is achieved. Unlike optical systems, the resolution of the present system increases as the distance remaining before contact becomes smaller, so that the closer the approach, the closer the control which becomes possible. At greater distances, where only coarse control is required, the lack of sensitivity is of little importance, and it may be desirable to use other techniques for gross motion control and collision avoidance, for example.

As those of ordinary skill in the art will readily recognize, it is relatively simple to combine the values of the discrete elements of the array of the present invention into a single composite measure of the capacitance between the array and the sensed object. The capacitive coupling involved may be direct coupling of the sensor array to the object, or an indirect coupling based on the interference of the object with the capacitive coupling of the sensor array with a background capacitive element. In either case, the coupling value is best treated as a single value, with the array treated as a single capacitor plate.

As contact occurs, the proximity regime will have performed its control function, i.e., of guiding, slowing and limiting the approach mechanism, and initiating the engagement element, such as a robotic gripper or "hand" or the like. At this point, the collective function will have served it's purpose, and the control system should thereafter switch into a different mode, based on the capacitive coupling of the discrete elements of the sensor array individually or in discrete groups of elements.

Among the parameters to be evaluated, surface roughness can be measured in one or more points of the sensor contact area, in the manner disclosed by the above cited prior art.

Additional parameters to be measured and determined may include the following:

Shape; orientation of shape; part identification; edge location; critical parameter tolerances; and slip of the contact between the array and the part. Each of these is of great importance in the field of robotics and computer aided manufacture, and there is a rather great body of prior art relating to each such function. It is a great advantage of the present invention that each of these diverse functions can be effectively performed by a single, relatively simple sensor, with a high degree of accuracy and reproducability. The prior art has grave difficulties with each of these functions, and some are not available in the prior art in any effective way at all.

The determination of shape by the array is developed by polling of the discrete elements of the array to arrive at a capacitive coupling pattern which, either via proximity determinations or contact characteristics or some combination of both, will provide a "profile" characteristic of the shape of the part. By comparison of the profile of a part with a library of such profiles, via a lookup table or the like, the general shape properties of the object, or some component part thereof, can be ascertained. The capacity of the system for direct determination in the foregoing fashion may be sufficient to many circumstances to determine the identification of one among a relatively limited inventory of possible objects. In other circumstances, the direct profile measure may result in ambiguities, and require further discrimination. The additional discrimination is a feature of the discussion hereinafter.

Part orientation is closely related to part identification, and poses like requirements, although there are enough differences to impose some additional and different requirements. Both in the proximity sensing phase of operation, and in the groping which occurs at the point of initial contact, a number of parameters can be evaluated which in many circumstances will be adepuate to both identify the part and define its orientation. Among these, the coupling profile on approach will be characteristic of orientation as well as shape, for any part which has features which effect the coupling profile. Substantially any feature will have an influence on the capacitive coupling characteristics. There will be other part identifying information in the surface roughness characteristics described above. It is also possible to evaluate the properties of shape of an edge or other feature which contacts the sensor array by triangulation of values obtained by individual sensor elements within the array. Via the capacitive edge effects, the presence of nearby features can be determined. Through the well known technique of lookup tables, of some equivalent approach to pattern recognition, the orientation of the part and its identification can be made in all but the most highly ambiguous of cases.

The techniques of pattern recognition are well known in the art and do not in themselves form a part of the present invention. The advantage of the present system lies in the multiplicity of independent parameters available to the recognition system, and the resulting facility with which unambigous determinations can be made. The same characteristics can be highly effective in reducing the scope of the search and, in turn, result in greater speed of reaching decision points and reduced computational burden. Unlike computer vision based pattern recognition techniques where the available data is all of a like kind, based solely on size and shape parameters, the divergent properties evaluated in the present system afford a simpler decision making logic. If the present system is coupled with an optical or related pattern recognition system, which may be desirable for other purposes as noted above, the computational demands on the optical system are reduced, and lower resolution can be employed, since the decision making ambiguity can be performed by other means. Even relatively crude and rough pattern recognition results can be quite effective when supplemented with the very different perceptions available from the present system.

Quality control evaluation of parts to assure that each part is within acceptable tolerances is another aspect of the present sensor array, or in some cases another dedicated array for the evaluation of a specific part. In this aspect, the objective is to quantify the appropriate dimensions, surface finish, and other related characteristics of a part in relation to a set of tolerances. For simple parts, the data available from the sensor array as described above may be adequate to the need. It may be, however, that more detailed data, or more sensitivity is needed than can be attained with the primary sensor array. In that event, a secondary sensor array, specific to the part to be evaluated, will be provided.

The part specific sensor will be of a shape and size closely corresponding to the surface of the part, and through proximity and tactile sensing, as described above, conformity to the required shape and dimensions can be rapidly and precisely determined. The secondary sensor array is discussed in more detail infra.

Once a robotic gripper has sucessfully navigated to a part, identified the part and its orientation and successfully engaged it, it must be manipulated by the robotic system. In that context, picking up the part, moving it to an intended location, and utilizing it in the intended manner, requires several additional controls. The system must have a reliable means to insure the integrity of the grip so that the part is not damaged by excessive force or dropped by insufficient force. At a more subtle level, slip sensing is of considerable importance in assuring proper assembly operations, particularly in stopping the operation when something goes amiss, such as a misfit of parts, or the like. The avoidance of slip at proper gripping and assembly forces is a direct assurance of proper assembly, alignment, and fit, thus affording a direct quality control and assurance parameter of considerable value in relation to the finished assembly, as well as furnishing substantive information for control feedback in the manufacture of the component parts.

Slip sensing in the present invention is based on the observation that discrete areas of surfaces of parts vary in surface roughness. In even the most uniformly controlled industrial processes, the finish of the surface of a part will vary by at least about ten percent. Thus, it has been observed that when a capacitance sensor of the type disclosed herein is engaged with a surface, any slip between the sensor and the surface will result in a directly detectible change in the capacitance and will be a highly reliable indicator of such slip. It has been found that the sensitivity of the detection is adequate to detect a motion of one microinch ($1.0 \times 10^{-6}$ inches), although it will be sufficient in most applications to detect a motion on the order of 50 to 100 microinches, thus simplifying the system. The response time for such a measurement is a function of the sampling rate and cycle time of the measurements, which are preferably over a period of ten milliseconds or less. The sensitivity and response of the system can be enhanced by the employment of higher sampling rates and higher base rates of the counter oscillator whose rate is altered by the variable capacitive coupling between the sensor and the part. At these levels of sensitivity, an effective real time closed loop feed back data source is generated which can be effectivly and reliably employed to control gripping force, in a fashion never before available to the art.

As has been noted, the sensing of slip is in reality a sensing of change of surface roughness. In this regard, it should be pointed out that the above cited patent to Risko, i.e. U.S. Pat. No. 4,422,035, is directed to the use of a capacitor sensor for sensing surface roughness. Therefore, the teachings in the subject Risko patent are most pertinent here, particularly regarding the circuitry described by Risko in converting the change in capacitance into a useful signal. Therefore, the teachings in the subject Risko patent, i.e. U.S. Pat. No. 4,422,035, are incorporated herein by reference.

All the operations in the present invention are based on the primary relationship $$C = K \times A / t$$

where C is capcitance, K is the effective dielectric constant (a composite value in the present context), A is the area of the coupling surfaces, and t is the average distance between the plates.

In the context of the present invention, K and A are effectively fixed values, so that in the proximity based measurements, C is seen to be inversely proportional to t. It is also apparent that as t grows smaller and smaller, the magnitude of the change on C grows larger and larger, so that at the stage of close approach, even very small and gradual changes in distance produce quite substantial signals for control purposes. The increase in sensitivity and resolution at the critical juncture has not heretofore been available to the art.

As contact is achieved, surface roughness can be ascertained in the manner disclosed by Shum and Risko in their respective teachings. It is important to note however, that any element of the array which is not in full contact with the surface, i.e., not in contact at all, or having an edge cross its area, will produce an aberrant value, and should be disregarded. Such anomalies will be easily dealt with, however, by using only the capacitance value or values with the greatest magnitude among the plural elements.

What are anomalies for the measurement of surface roughness are significant data for the evaluation of edge location and shape properties, so that the data disregarded in the roughness determination is directly used in the evaluation of edge locating and shape evaluating operations in the present system. The triangulation of the varying data among the plural cells of the array is computationally simple, since the extent of coverage of each cell is the variable, while K and t are fixed values, and for each cell, C is directly proportional to A, as given in the above formula, although it is necessary to correct for capicitance edge effects. With a known topology of the elements or cells of the array, and the measured proportion of each cell which is in contact with the part, the calculation of edge location and shape characteristics are relatively simple. For any part in which the shape of such an edge is unique, the shape determination is an identifying parameter. In most other circumstances, the shape determination of the edge portion in contact with the sensor array will not be a dispositive chacteristic, but it will furnish some input to the decision making process. In circumstances where the edge does not pass across the cells of the array, the edge is a feature of the structure, as discussed below.

While the primary coupling involved in the direct measurements with the sensor array system of the present invention are based on the directly opposed areas of the cell and the part, capacitance edge effects play a direct and important role. In many of the determinations in the present invention, it is necessary to take steps to minimize edge effects to assure the greatest reliability of the results. On the other hand, edge effects can be constructively employed when it is recognized that features remote from the contact area itself will influence the edge effects. While the specific consequences of a particular feature, and the nature of the detectable influence on capacitance is highly complex and difficult to predict, the use of predetermined effects, and patterns of effects, can be highly effective in pattern recognition operations for the identification of parts, and for the measurement of part orientation. Most often these aspects of the system will be based on known pattern recognition techniques, with prerecorded patterns stored in a library of values used as a lookup table. While other approaches are possible, the resolution of shapes, locations of features and other such evaluations based on edge effects are computationally intense and are not usually preferred.

Figure 1:
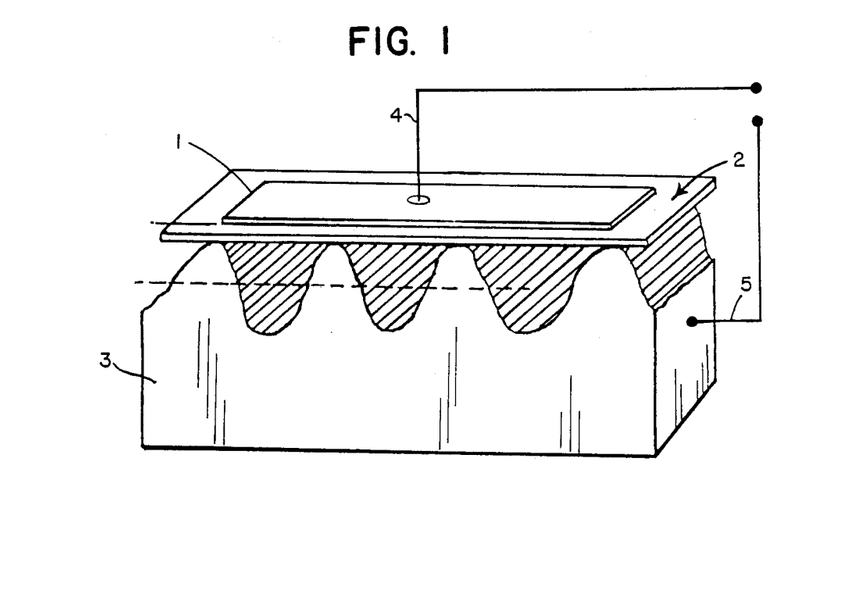
FIG. 1 is a schematic representation of the relationship of a capacitor element with a surface, showing the relative relationships and electrical connections employed in the present invention.

The sensor elements of the array, considered individually, each have a structure shown in exploded schematic form in FIG. 1. In that Figure, the sensor capacitor plate 1 is carried on a dielectric 2, required to prevent shorting of the capacitor plate 1 to a part or workpiece 3. The plate 1 has electrical lead 4, which together with part contact lead 5, constitute the input capacitance leads to the oscillator and counter circuitry.

Figure 2:
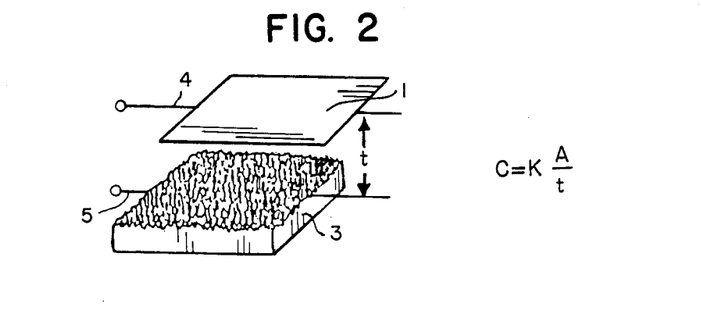
FIG. 2 is another schematic representation illustrating the relationships of sensor and object surface in relation to the measurement of capacitance and change in capacitance.

The electrical circuit elements of the sensor and their function in the present invention are shown in stylized form in FIG. 2.

Referring again to FIG. 1, the active capacitor plate element 1 and its dielectric 2 are preferably formed from an electrical conductor, such as aluminum or the like plated on the surface of a synthetic polymer film, such as polyethylene terephthalate film, a cross linked polyethylene imine, or the like. Aluminum coated Mylar is commercially available and is preferred. The aluminum can be etched from the surface of the film is known fashion to provide a capacitor plate element of the desired size and shape. The electrical contact from the sensor plate element 1 to the oscillator component is furnished by an electrical lead 4 which may be an integrally formed component of the etched surface, or may be an electrical lead bonded to the surface of the capacitor plate element 1 with a conductive adhesive, such as silver filled epoxy resin based adhesives and the like. Solder connections may also be employed if care is taken to protect the components of the system from the heat required.

In the context of the present invention, the electrical lead 4 is preferably a conductive elastomeric material, preferably a silicone elastomer with a conductive filler. It is far easier to arrange the multiple contacts required for the sensors in such case than by efforts to employ the conductive layer on the Mylar film. In an alternate arrangement, the electrical lead may be formed of conductive fibers, such as X-Static silver plated nylon fiber monofilament available from Saquoit Corp. in Scranton, Pa.

The capacitor plate element 1 is preferably provided with an elastomeric backing 7 which serves to press the surface of the dielectric face of the sensor into a uniform and even contact with the surface of a part or workpiece as an aid to the reproducability of the measured values which are a function of the workpiece, independent of the specific applied force of the robotic gripper, the alignment angle of the sensor to the workpiece surface, and other like variables.

Figure 3:
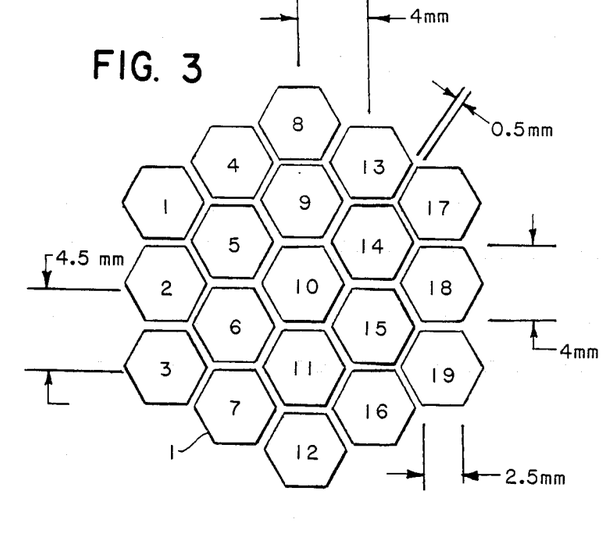
FIG. 3 is a schematic view of the layout of plural capacitive sensor elements in an array.

The capacitor elements as shown in FIGS. 1 and 2 are, as has been noted, components in an array. The preferred arrangement of the array is a hexagonal pattern of hexagonal elements, as shown in FIG. 3. In FIG. 3, a specific array is shown, of a multiplicity of plate elements 1, on a common dielectric film, of Mylar or the like. While in FIG. 3, 19 capacitor plate elements 1 are shown, other numbers of component plate elements can be employed, in other configurations, to suit particular applications.

As a general rule, the higher the number of elements for a given sensor area, the greater the resolution which can be achieved. As those of ordinary skill in the art will recognize, greater numbers of elements will require higher manufacturing costs, greater computational burdens on the system, and greater complexity and control difficulties. It is accordingly preferred to limit the number of elements to the minimum necessary to achieve the required degree of resolution for a given application. In addition, the capacitance values are a function of plate area, and as the dimensions of the individual elements is decreased, and the number is increased, there is a limit where the noise of the system from edge effects and ambient noise becomes a barrier to increasing resolution. The limits on the dimensions will vary, but as a general rule, elements having an area of less than about 0.02 square millimeters are likely to prove to have signal to noise ratios which approach the limits of practical circuit design and real time computational burdens. In cases of compelling need, where the extra demands on the circuits and computing loads can be justified, it is possible to achieve meaningful results at a level which is about one order of magnitude smaller, but the general usage of the system of the present invention will often be satisfied without resort to the small elements which are possible, and sizes on the order of 0.1 to 2.0 square millimeters will be effective in the majority of applications. While there may be contexts where even coarser resolution may be sufficient, and while there is no functional upper limit on the size of the plate elements, it will generally not be of any practical interest to make such arrays with elements having more than about 10 or 12 square millimeters. Even in applications which do not require the resolution of such arrays, it will rarely be worthwhile to make arrays with larger plates.

Figure 4:
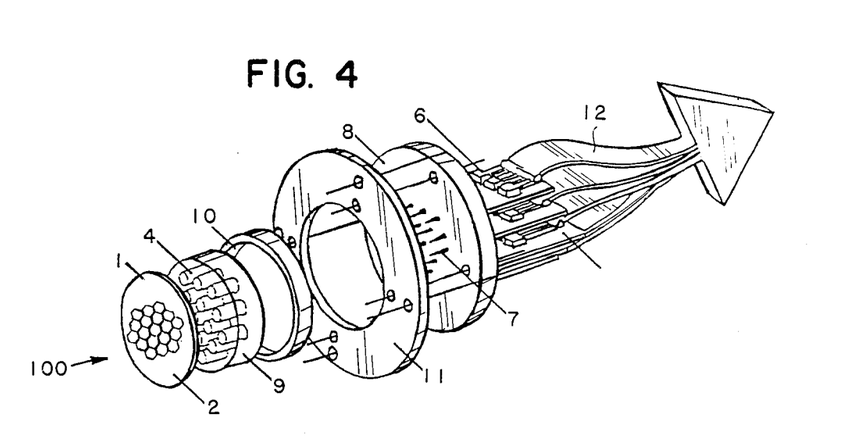
FIG. 4 is an exploded perspective view in schematic form of one embodiment of the present invention.

For the array configuration shown in FIG. 3, the structure of a preferred specific embodiment representing the best mode of the sensor to date is shown in exploded form in FIG. 4. The reference numerals correspond to those of the preceeding figures, where 1 represents the capacitor plate elements, collected into a multiple element array 100, 2 is the dielectric, 4 represents the multiple elastomeric electrical leads from each capacitor plate 1 to its associated oscillator 6. As seen in the present FIG. 3, there is one oscillator for each capacitor plate element 1. Although not all the plural leads 4 and not all the oscillators 6 can be shown in the figure without a loss of clarity, it is readily apparent that the structure will benefit considerably from the microminiaturization of these components. See FIG. 4. The plural oscillators are preferably incorporated into a single integrated circuit chip with multiple lead inputs and outputs. These matters are discussed in greater detail infra.

The electrical leads 4, which are present in a number equal to the number of the capacitor plate elements 1 in the array, are, as previously noted, formed of a conductive elastomer material, bonded to the face of the capacitor plate elements with a conductive bond, preferably a silver filled epoxy resin adhesive. Many such adhesives are commercially available in the art. The connection between the elastomeric lead 4 and the oscillator 6 is conveniently made by contact pins 7, which may themselves be adhesively bonded to the leads 4. The contact pins 7 are carried on and penetrate through a mounting plate 8, formed of a suitable non-conductive material, e.g. nylon, polyimide, or other like polymer material. The mounting plate 8 serves as a mount for the oscillators 6, and associated circuit elements, including output leads 12, and may, if desired be a printed circuit board designed for the purposes required in the context of the present invention. The capacitor element array 100, with plural capacitor plate elements 1, and the dielectric 2 are provided with an elastomer backing 9 which performs the functions already discussed supra, and which also serves to pot the electrical leads 4, insulate them from one another, and to furnish physical support for the array of leads. The potting elastomer should have an elastic modulus which is not too greatly different from the moduli of the plural leads 4, and should preferably be about the same or slightly higher. The length of the leads 4, and the thickness of the elastomeric potting layer 9, should be the minimum necessary to connect the sensor plates 1 to the oscillator contacts 7, and to provide the backing necessary to maintain the contact of the array with the surface of a workpiece in a uniform even contact pressure. The assembly is completed by mounting ring 10, which functions to confine the sensor array in place, dimensioned so that the dielectric layer 2, and the capacitor elements 1 stand proud of the surface by a small amount, and upon contact with a part or workpiece are compressed, along with the elastomeric backing 9. The entire assembly is held in place in an aperture in the surface of its robotic gripper or other environment of use by retainer ring 11.

Output leads 12 pass the signal from each of the oscillators 6 to the signal processing circuitry at an external location not shown.

FIG. 4 shows a schematic version of the circuitry of the sensor, including the various elements of the array which are electrically active. The reference numbers correspond to those employed in the other figures for corresponding elements.

While the present invention is directed to the sensor, and its use in the generation of the outputs described herein, the signal processing is of course an important element in the use thereof. The output of each oscillator in the system is the functional equivalent of a single capacitor sensor, and may be used singly, as disclosed and discussed by Shum and Risko, disclosed and discussed above. It is, however, when the plural output signals are used collectively that the unique benefits of the present invention are particularly achieved. It is when the values of various of the elements are separately established and evaluated, and the results combined and compared in appropriate fashion, that the highly desirable proximity and tactile sensing properties are achieved.

For the detection of slip, first and foremost, the capacitance values of a variety of elements in the array is polled, ordinarily in serial fashion, and the oscillator rate determined for each, or more commonly some digital value which is a function of the oscillator frequency, such as a count of the beat frequency of the oscillator against the clock rate of the system, or the like, is evaluated for change over time. Within some dead band zone which is desirable to damp the effects of minor variations in the system, change is ignored, so that a change outside the deadband will be a direct measure of incipient slip between the workpiece and the sensor array. As those of ordinary skill in the art will readily recognize, the output can be employed in the control of gripper force, so that as incipient slip is recognized in the system, the force is increased until slip ceases. As already noted, the systen can detect slip on the basis of a motion of as little as one microinch, although the provision of a deadband and a relatively slow cycle of measurement may result in a sensitivity of higher magnitudes. At a ten millisecond interrogation cycle or slower, it has been found that slip can reliably be detected in one cycle. For most applications, a thirty to fifty millisecond cycle rate will be sufficient. While no actual lower limit to the sensitivity has yet been attained, it is believed that the sensor is capable of detecting slip within less than one millisecond, although at that level the computational load will make such rates of limited use until better real time computation is available.

As those of ordinary skill in the art will readily recognize, the signal processing requirements of the system are intense if real time utilization of the signals generated by the multiple oscillators at the high level of resolution contemplated herein. It will generally prove effective to reduce the data manipulation burden by digitizing the oscillator signals. This is conveniently done by a simple count of the oscillator frequency on some appropriate time basis, or by taking the count of the beat frequency of the oscillator against some standard clock rate oscillator. Additional facility can be achieved by multiplexing of the multiple channels of data. The compacted data thus attained represents a managable but data rich input to the data processor, which can then manipulate the signals in the various fashions described herein above. It is additionally possible to compress the data still further by polling the individual elements, or sets of individual elements in serial fashion by switching among the plurality in some regular way. Thus, the output will then be a composite of discontinuous sampling of the individual elements. None of the values to be determined is dependent on continuous data from any single element of the array, although it should be noted that if such techniques are employed, slip sensing and proximity sensing and approach control are very directly time dependent. If these parameters are measured, the switching should be at a frequency consistent with the requirements of these time dependent features.

Specific algorithms for each of the functions is available to those of ordinary skill in the art, and will not be individually discussed herein. It will suffice for the guidance of the practitioner to note that the employment of specific algorithms, particularly in pattern recognition, for the determination of identity and orientation of objects is based on a rich variety of data which can be derived from supplements to the standard positional shape data to which optical systems are limited, and that the recognition system can benefit from a reduction in computational requirements if the tactile data are employed to narrow the range of possibilities in a binary decision tree, for example, to families of possible objects, and to exclude other possibilities which do not have corresponding properties. In this fashion, the discrimination of the system can be increased, and the time dependent computational load reduced. If is particularly useful to use tactile data concerning suface characteristics and edge shapes as a means to exclude from shape recognition and pattern recognition computations all the objects of materials or finish properties which do not correspond to the data. If even a few possible objects can be excluded from the pattern recognition searches, material savings in processor activity and search time can be realized. Obviously, such benefits will be dependent on the set of possible objects and the degree to which they can be grouped by such tactile properties. There will be a considerable opportunity to use such system logic is most situations, however.

In specific quality control applications, the degree of discrimination and resolution available in the general purpose sensor array may not be be sufficient for measurement of the closest tolerances required, and it is therefore desirable in such circumstances to provide additional part specific dedicated array sensors conforming to the configuration of the part shape and size. By the use of such dedicated sensors, conformity to the required shape can be directly and precisely measured and evaluated, leading to a real time decision concerning the critical quality control parameters. It is also possible to employ the specific data to define and control specific part correction processes to bring defective parts within tolerances.

The dedicated sensor array for any specific element or part will be electronically the same as the primary sensor array, but the capacitor plate array and the dielectric will be formed into a shape closely corresponding to the surface of the desired part. The potting composition is employed to preserve the shape, and the length of the leads may require adjustment. Otherwise the structure will be the same. It is desirable that the potting formulation be more rigid, i.e., less compressible, than in the more general case, since it is conformity to the desired shape which is to be determined, and with a relatively rigid backing, no allowance or compensation for deformation of the backing is necessary. Polyurethanes and epoxy resin formulations are preferred backing materials for these types of sensors. The variance in capacitance among the various elements of the array, when edge effects are compensated, will then be a direct measure of conformity to the required shape and size parameters for the object being evaluated. A specific set of tolerances may be developed, either as a lookup table or by a specific algorithm for manipulating the values detected, which can furnish yes or no decisions concerning the acceptability of the object, and additionally, in many operations, to quantify the out of tolerance parameters to serve as control signals for corrective operations.

The secondary dedicated sensor arrays may, as those of ordinary skill in the art will appreciate, be used in conjunction with other types of jigs and tools for the measurement and evaluation of parts.

Since the primary sensor array is most often employed with a robotic gripper or hand, it is relatively simple for the system to transport the object to the secondary sensor, engage the object with the sensor, and then transport the object to the next appropriate location, as determined by the system logic. In an alternative approach, it is also possible to move the sensor to the part by a separate mechanism. It may be necessary for the gripper to release the object while the measurement is made, but that can be an appropriate opportunity for the gripper to then grasp the object in the optimum location and orientation for the next subsequent operations.

It is also possible to use such secondary dedicated sensor arrays for the resolution of part identification ambiguities which cannot be finally resolved by the primary sensor array. By a combination of usage of the primary array for screening, and dedicated shaped arrays for final resolution, a very high reliability in part identification is possible, and the processor computational and data comparison burdens may be materially reduced and spread over time. Since such ambiguities will not often exist for every part engaged, the extra manipulation and processing involved will be an intermittant operation.

If the robot system includes tools for controlled working of the parts, it may be possible to bring each part, or many parts within tolerances by such techniques, employing the data obtained from the dedicated sensor array to guide such corrective work, such as grinding, polishing, and the like. With appropriate means to clean the part, it can be subjected to periodic reevaluation for its conformity to specifications. It may be possible, and in some cases desirable to provide such operations as a branch loop in the robotic operation with separate equipment to permit continuing operation of the primary operations while corrections are being made to out of spec parts.

As those of ordinary skill in the art will have already recognized, the dedicated sensor array operations function as smart feeler guages, and offer to the art rather precise capabilities to improve quality control of part evaluation, correction and subsequent use in a fashion which offers considerable improvement. Such operations have been largely done by manual operations, requiring highly skilled and expensive labor in relatively large amounts. Hand operations do not offer the level of precision or reliability attainable in the present technique, and are generally slow. The present invention offers relief to the art from the generally slow and unpopular requirements of such operations, with a substantial opportunity for improved results and reduced boredom in the work shop.

The foregoing discussion is illustrative and the specification and drawings are not intended to be limiting on the scope of the present invention. They are intended to guide those of ordinary skill in the art in the practice of the invention, and should be be construed as definitive of the meets and bounds of the invention. The limits of the invention are defined by the following claims.

What is claimed is:

1. A capacitance sensor array for proximity and tactile sensing of properties of an object comprising a plurality of capacitor plate elements formed in an array of known topology, means for actively connecting each of said plate elements and said object to one of a plurality of corresponding oscillator circuits so that the oscillation frequency of each said circuit is a function of the capacitance between each said plate element and said object, when said sensor array and said object are in contact, and means for generating an output from said sensor which is a function of the tactile properties of said object from the said plurality of oscillator circuits.

2. The sensor of claim 1 wherein said output from said sensor responds to a changes in the capacitance of said individual capacitor plate elements and is thereby a function of slip between said sensor and said object.

3. The sensor of claim 2 wherein said output is a function of a relative movement between said sensor and said object with a lower limit of about 1000 micrometers.

4. The sensor of claim 2 wherein said output is a function of a relative movement between said sensor and said object with a lower limit of about 100 micrometers.

5. The sensor of claim 2 wherein said output is a function of a relative movement between said sensor and said object with a lower limit of about 2.5 micrometers.

6. The sensor of claim 2 wherein said output detects slip in about 50 milliseconds or less.

7. The sensor of claim 2 wherein said output detects slip in about 30 milliseconds or less.

8. The sensor of claim 2 wherein said output detects slip in about 10 milliseconds or less.

9. A capacitance sensor for detecting relative movement between said sensor and an object capable of detecting movements of about 2.5 micrometers and greater in a time of about 10 milliseconds or less, when said sensor and said object are in contact with one another, comprising means for capacitively coupling said sensor and said object, oscillator means having a frequency rate which is a function of the capacitance between said sensor and said object, and means for generating a output signal which is a measure of slip from a change in the frequency of said oscillator representing a change in capacitance between said sensors and said object.

10. The sensor of claim 9 wherein said output is a plurality of signals corresponding to the oscillation frenquency of each said oscillator.

11. The sensor of claim 10 wherein said output is a continuous parallel output.

12. The sensor of claim 10 wherein said output is a serial output of each of said plurality of oscillators taken in sequence.

13. The sensor of claim 10 wherein said output is a serial plurality of sequential parallel outputs of a plurality of said oscillators.

14. A detector for determining tactile and proximity information concerning an object in contact therewith, comprising a sensor having a plurality of capacitor plate elements formed in an array of known topology and signal processing means for employing said sensor signals resulting from variations in capacitance between the individual capacitor plate elements and said object to determine tactile and proximity information about said object.

15. The detector of claim 14 wherein said signal processing means evaluates the change in capacitance between said detector and said object as a function of the distance between them.

16. The detector of claim 14 wherein said signal processing means evaluates the capcitance signals to detect the shape of said object.

17. The detector of claim 14 wherein said signal processing means evaluates the capacitance signals to detect the orientation of said object.

18. The detector of claim 14 wherein said signal processing means evaluates the capacitance signals to detect the location and orientation of edges of the object.

19. The detector of claim 14 wherein said signal processing means evaluates the capacitance signals to detect a relative movement between the sensor and said object.

20. The detector of claim 14 wherein said signal processing means is employed to generate control signals for a tool which is operatively associated with said object.

21. The detector of claim 20 wherein said control signals are generated as real time controls of said tool.

22. The detector of claim 20 wherein said control signals are real time closed loop feedback control signals.

23. The detector of claim 22 wherein said tool is a robotic gripper which engages and manipulates said object.

24. A capacitance sensor array for tactile sensing of quality control properties of an object comprising a plurality of capacitor plate elements formed in an array of topology conforming to the topology of the design of said object, means for actively connecting each of said plate elements and said object to one of a plurality of corresponding oscillator circuits so that the oscillation frequency of each said circuit is a function of the capacitance between each said plate element and said object, and means for generating an output from said sensor which is a function of the conformity of the shape of said object to the shape of said design topology of said object determined by response of the said plurality of oscillator circuits.

* * * * *